(12) United States Patent
Watanabe et al.

(10) Patent No.: US 11,434,980 B2
(45) Date of Patent: Sep. 6, 2022

(54) TENSIONER LEVER

(71) Applicant: TSUBAKIMOTO CHAIN CO., Osaka (JP)

(72) Inventors: Masanori Watanabe, Osaka (JP); Shuji Hamaguchi, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 56 days.

(21) Appl. No.: 17/036,315

(22) Filed: Sep. 29, 2020

(65) Prior Publication Data

US 2021/0156456 A1 May 27, 2021

(30) Foreign Application Priority Data

Nov. 21, 2019 (JP) .............................. JP2019-210116

(51) Int. Cl.
*F16H 7/08* (2006.01)
*F16H 7/18* (2006.01)

(52) U.S. Cl.
CPC ................ *F16H 7/08* (2013.01); *F16H 7/18* (2013.01); *F16H 2007/081* (2013.01); *F16H 2007/0846* (2013.01); *F16H 2007/0872* (2013.01); *F16H 2007/0878* (2013.01); *F16H 2007/0893* (2013.01); *F16H 2007/185* (2013.01)

(58) Field of Classification Search
CPC ................ F16H 7/08; F16H 2007/081; F16H 2007/0863; F16H 2007/0872; F16H 2007/0876; F16H 2007/0878; F16H 2007/0893; F16H 7/18; F16H 2007/185; F16H 2007/0846; F16H 2007/0804

USPC .......................................................... 474/111
See application file for complete search history.

(56) References Cited

U.S. PATENT DOCUMENTS

| | | | | |
|---|---|---|---|---|
| 3,148,555 A * | 9/1964 | Peras | ......................... | F16H 7/08 474/111 |
| 4,976,659 A * | 12/1990 | Hans | ...................... | F16H 7/0834 474/111 |
| 6,428,435 B1 * | 8/2002 | Kumakura | ................ | F16H 7/08 474/111 |

(Continued)

FOREIGN PATENT DOCUMENTS

| | | | | |
|---|---|---|---|---|
| DE | 102011108723 A1 * | 2/2012 | ................ | F16H 7/08 |
| DE | 102014211517 A1 * | 12/2015 | ............. | F16H 57/01 |

(Continued)

*Primary Examiner* — Michael R Mansen
*Assistant Examiner* — Raveen J Dias
(74) *Attorney, Agent, or Firm* — WHDA, LLP

(57) ABSTRACT

An object of the present invention is to provide a tensioner lever that can reduce vibration and noise when the chain runs, and realize smooth attachment into an engine with minimal deformation of the lever body with a simple configuration. A tensioner lever according to the present invention includes a lever body and a torsion coil spring pressed the lever body toward the chain. The lever body includes a stopper member mounting part where a stopper member by which the support arm of the torsion coil spring is locked and which retains the torsion coil spring in a compressed state is removably mounted. The stopper member mounting part is located closer to a distal end of the lever body than a center position in the longitudinal direction of the lever body, or a center of gravity position of the lever body.

3 Claims, 3 Drawing Sheets

(56) References Cited

U.S. PATENT DOCUMENTS

| | | | |
|---|---|---|---|
| 7,540,817 B2 * | 6/2009 | Hashimoto | ........... F16H 7/0848 |
| | | | 192/41 S |
| 2009/0111629 A1 | 4/2009 | Kobara et al. | |
| 2016/0252166 A1 | 9/2016 | Noro | |
| 2017/0184183 A1 | 6/2017 | Noro et al. | |
| 2021/0131531 A1 * | 5/2021 | Muratsubaki | ............. F16H 7/08 |
| 2021/0262552 A1 * | 8/2021 | Seki | ........................ F16H 7/08 |
| 2021/0356022 A1 * | 11/2021 | Muratsubaki | ............. F16H 7/08 |

FOREIGN PATENT DOCUMENTS

| | | | | |
|---|---|---|---|---|
| JP | 2009-108909 A | 5/2009 | | |
| JP | 2016-160985 A | 9/2016 | | |
| JP | 2017-115952 A | 6/2017 | | |
| WO | WO-2014044421 A | * 3/2014 | ............... | F16H 7/08 |
| WO | WO-2019061464 A1 | * 4/2019 | ............... | F16H 7/08 |

\* cited by examiner

TENSIONER LEVER

BACKGROUND OF THE INVENTION

1. Field of the Invention

The present invention relates to a tensioner lever that slidably guides a running chain, and more particularly to a chain tensioner lever that slidably guides a chain by pressing a shoe surface of a lever body against the chain by the resilient force of a torsion coil spring.

2. Description of the Related Art

Tensioner levers have been used in chain transmissions for an auxiliary machine or the like of a car engine to remove slackness in chains and to prevent vibration of running chains. One such known tensioner lever, which is pivotably attached to an attachment surface of an engine block or the like, includes a lever body having a shoe surface that slidably guides the chain, and a torsion coil spring interposed between the lever body and the attachment surface to press the shoe surface toward the chain (see, for example, Japanese Patent Application Laid-open Nos. 2009-108909, 2016-160985, and 2017-115952).

These tensioner levers are attached to an attachment surface such that a winding part of the torsion coil spring is loosely fitted around an outer circumferential surface of a boss part formed to protrude from a base part of the lever body toward the attachment surface, with a pressing arm extending from one end of the winding part contacting the lever body, and with a support arm extending from the other end of the winding part having a distal end portion being inserted in a spring retention hole formed in the attachment surface. In such a tensioner lever, the load received from the chain twists the torsion coil spring, whereby a reaction force in accordance with the twisted amount (angular change of the pressing arm) is obtained.

Before this tensioner lever is attached to an attachment surface, the distal end of the support arm extending from the other end of the winding part is locked by a stopper member mounted to the lever body, for example. In the tensioner lever described in Japanese Patent Application Laid-open No. 2009-108909, for ease of assembly to the engine, a stopper pin mounting part having a pin lock hole, for a pin member that is the stopper member to be inserted into, is formed to a circular arc circumferential wall part of the lever body, which defines therein a space for accommodating the winding part of the torsion coil spring, such as to protrude outward.

SUMMARY OF THE INVENTION

It is conceivable to use a torsion coil spring with a high spring load (for high load applications) for the tensioner lever in order to stop the chain from bouncing.

It has been discovered that, a torsion coil spring with a high spring load, if applied to tensioner levers of Japanese Patent Application Laid-open Nos. 2009-108909, 2016-160985, and 2017-115952, could cause deformation of the stopper pin lock hole, or deformation of the lever body itself as the tensioner lever ages. Such a deformation could lead to various problems such as assembling failure of the tensioner lever, shoe surface skewing, or defects in the chain line that is the running track of the chain.

The present invention solves this problem and it is an object of the invention to provide a tensioner lever that can reduce vibration and noise when the chain runs, and realize smooth attachment into an engine with minimal deformation of the lever body with a simple configuration.

The present invention solves the above problem by providing a tensioner lever including: a resin-made lever body having a shoe surface that is formed along a longitudinal direction and slidably guides a chain, and a base end rotatably supported on an attachment surface; and a torsion coil spring that is interposed between the lever body and the attachment surface and presses the shoe surface toward the chain, the torsion coil spring including a winding part loosely fitted around a boss part provided to the lever body, a pressing arm extending from one end of the winding part and making contact with the lever body, and a support arm extending from another end of the winding part and supported on the attachment surface, the lever body including a stopper member mounting part where a stopper member by which the support arm is locked and which retains the torsion coil spring in a compressed state is removably mounted, the stopper member mounting part being provided to a position closer to a distal end of the lever body than a center position in the longitudinal direction of the lever body, or a center of gravity position of the lever body.

According to the tensioner lever set forth in claim 1, the load applied to the lever body by the torsion coil spring in a state in which the support arm is locked by the stopper member can be reduced, and therefore deformation such as twisting of the lever body resulting from the spring load can be prevented. This allows for smooth assembling of the tensioner lever to the engine, and enables the tensioner lever to exhibit its designed performance consistently. This in turn enables use of a torsion coil spring with a higher spring load, whereby correct reaction force can be exerted to tension fluctuations that accompany changes in chain behavior, and bouncing of the chain can be suppressed.

Moreover, expected effects can be achieved with a simple configuration without compromising the characteristic advantages of tensioner levers such as better fuel economy by the non-use of hydraulic pressure, and better fuel economy by the small and light weight design.

The configuration set forth in claim. 2 helps to further reduce the load applied to the lever body in a state in which the support arm is locked by the stopper member, which reliably prevents deformation of the lever body, and allows for smooth assembling work of installing the torsion coil spring and attaching the tensioner lever to the attachment surface.

The configuration set forth in claim 3 prevents unintended release of the engagement between the support arm and the stopper member.

The configuration set forth in claim 4 provides the lever body with a structure that can sufficiently withstand twisting.

DESCRIPTION OF THE PREFERRED EMBODIMENTS

A tensioner lever that is one embodiment of the present invention will be hereinafter described with reference to the drawings.

Figure 1:
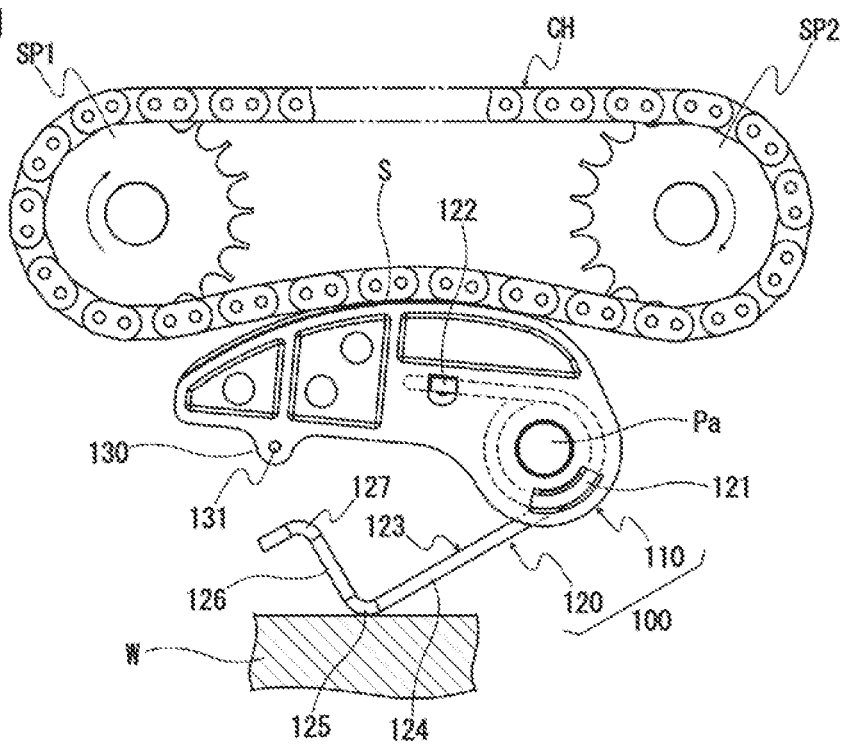
FIG. 1 is a diagram illustrating one example of a manner of use of a tensioner lever that is one embodiment of the present invention.

The tensioner lever 100, as shown in FIG. 1, is pivotably mounted on a pivot shaft Pa protruding from an attachment surface (not shown) of an engine block (not shown) or the like to slidably guide a chain CH passed over between a drive-side sprocket SP1 attached to a crankshaft and a driven-side sprocket SP2 attached to a shaft of an auxiliary machine to keep an appropriate chain tension.

The tensioner lever 100 includes a lever body 110 having a shoe surface S formed along a longitudinal direction for slidably guiding the chain CH and a base end rotatably supported on an attachment surface, and a torsion coil spring 120 interposed between the lever body 110 and the attachment surface to press the shoe surface S toward the chain CH. As illustrated in FIG. 1, the resilient force of the torsion coil spring 120 exerts a torque on the lever body 110 around the pivot shaft Pa toward the chain CH so that the lever body presses the chain CH via the shoe surface S.

The lever body 110 is made of a synthetic resin, for example, and the torsion coil spring 120 is made of metal, for example.

Figure 2:
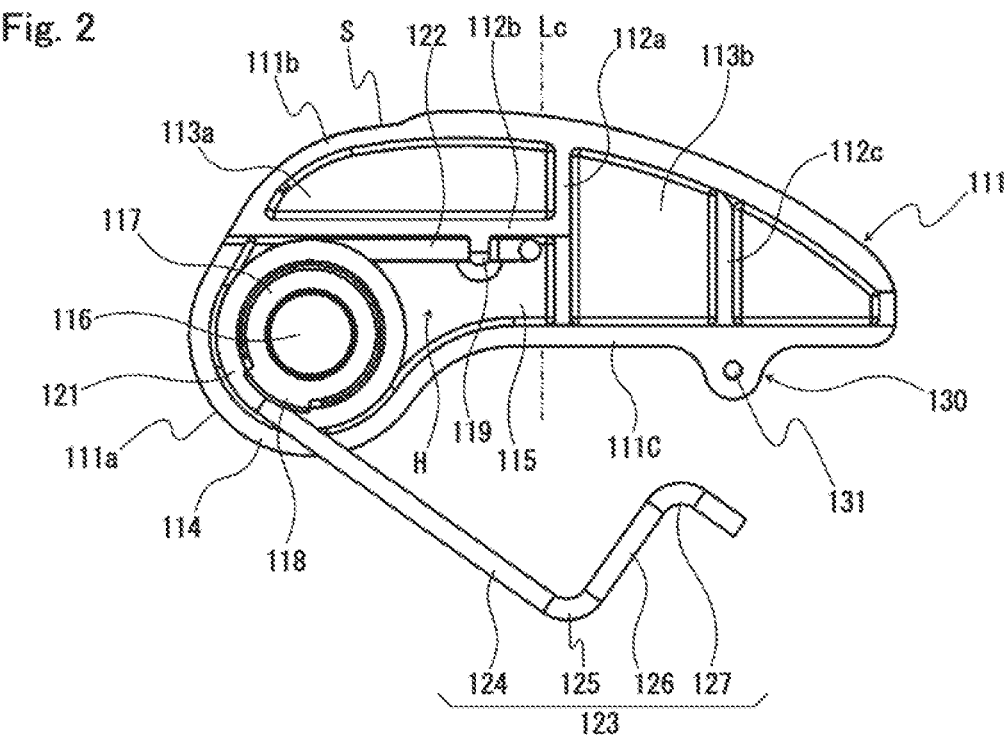
FIG. 2 is a side view on the backside illustrating the configuration of the tensioner lever from which the stopper member has been removed.
Figure 3:
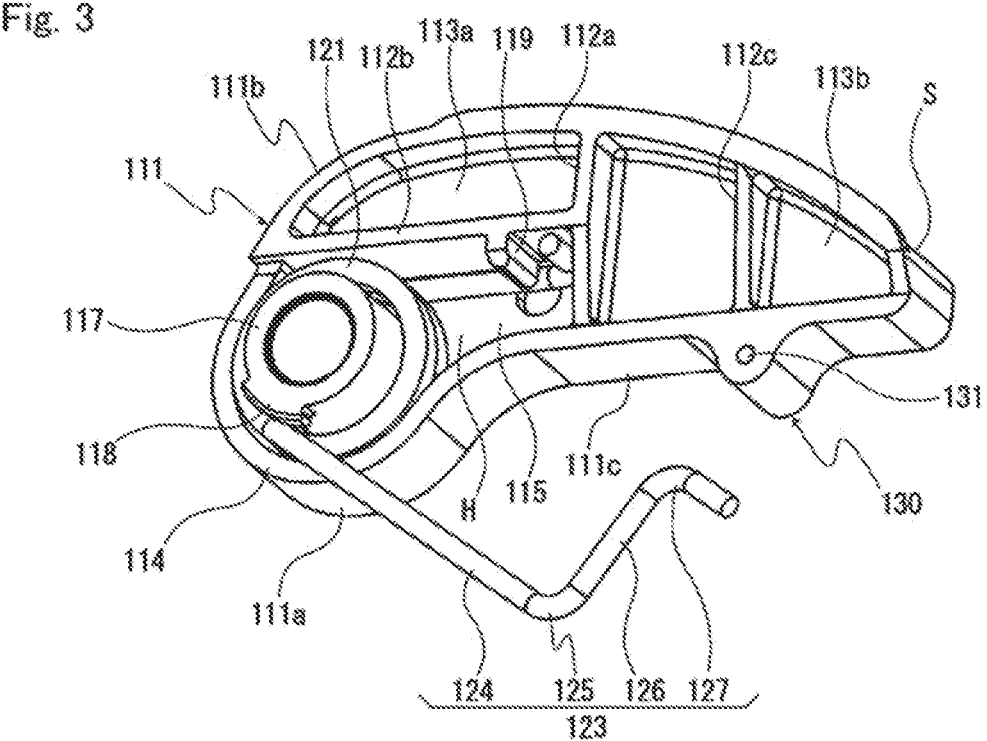
FIG. 3 is a perspective view on the backside illustrating the configuration of the tensioner lever from which the stopper member has been removed.

The lever body 110 has a lever circumferential wall 111 formed substantially in a comma-like shape in side view, as illustrated in FIG. 2 and FIG. 3.

The lever circumferential wall 111 includes a circular arc circumferential wall part 111a having a shape conforming to the circumference of a concentric circle having the same center as the pivot shaft Pa, a chain-side circumferential wall part 111b with one end continuing from one end of the circular arc circumferential wall part 111a, and having a shape conforming to a circular arc convex toward the chain CH, and a substantially planar non-chain-side circumferential wall part 111c with one end smoothly continuing from the other end of the circular arc circumferential wall part 111a and the other end smoothly continuing from the other end of the chain-side circumferential wall part 111b, and extending on the opposite side of the chain-side circumferential wall part 111b. An outer surface of the chain-side circumferential wall part 111b facing the chain CH and extending along the longitudinal direction is configured as the shoe surface S that slidably guides the chain CH.

The space surrounded by the lever circumferential wall 111 is partitioned to two cavities in the longitudinal direction by a center reinforcing rib part 112a provided between the chain-side circumferential wall part 111b and the non-chain-side circumferential wall part 111c. One of the cavities positioned on the side closer to the base end is further partitioned by a reinforcing rib part 112b extending along the longitudinal direction, with one part of the divided cavity positioned on the non-chain side forming a torsion coil spring accommodating part H. The other part of the divided cavity positioned on the side facing the chain CH is partitioned in the axial direction by a partition wall part 113a extending along a plane vertical to the direction in which the pivot shaft Pa extends.

The cavity positioned on the distal side is partitioned in the axial direction by a partition wall part 113b extending along a plane vertical to the direction in which the pivot shaft Pa extends, and each part of the divided cavity is provided with a reinforcing rib part 112c between the chain-side circumferential wall part 111b and the non-chain-side circumferential wall part 111c.

This design intends to reduce the weight of the lever body 110 while providing the lever body 110 with a structure that can withstand twisting sufficiently.

In a section of the lever body 110 which defines the torsion coil spring accommodating part H, a lever side wall part 115 that covers the torsion coil spring accommodating part H is formed continuously from an end face on the opposite side from the attachment surface.

The lever side wall part 115 is formed with a shaft hole 116 in which the pivot shaft Pa is inserted. A cylindrical boss part 117 is integrally formed to the lever side wall part 115 such as to protrude from the circumferential edge of the shaft hole 116 toward the attachment surface. With the pivot shaft Pa being inserted into the boss part 117, the lever body 110 is pivotably (rotatably) supported on the attachment surface.

The end face of the boss part 117 on the side facing the attachment surface is formed to protrude slightly more toward the attachment surface than the end face of the lever circumferential wall 111, which prevents other parts than this end face of the boss part 117 on the side facing the attachment surface from contacting the attachment surface, so that smooth pivoting (rotation) of the lever body 110 around the pivot shaft Pa is ensured.

A restricting protrusion 118 is formed on an outer circumferential surface of the boss part at the end on the side facing the attachment surface to restrict the torsion coil spring 120 from moving toward the attachment surface. This way, in a state before the tensioner lever 100 is attached to the attachment surface, the torsion coil spring 120 is prevented from coming off of the lever body 110, and also, in a state where the tensioner lever 100 is attached to the attachment surface, the torsion coil spring 120 is prevented from interfering with the attachment surface.

The torsion coil spring 120 includes a winding part 121, a pressing arm 122 extending straight from one end of the winding part 121 positioned on the side closer to the lever side wall part 115, and a support arm 123 extending from the other end of the winding part 121 on the side facing the attachment surface.

The winding part 121 is set loosely on the outer circumferential surface of the boss part 117 in the torsion coil spring accommodating part H, i.e., with a clearance fit on the outer circumferential surface of the boss part 117.

The pressing arm 122 is disposed in contact with the inner surface of the reinforcing rib part 112b over the entire length thereof, for example. A distal end portion of the pressing arm 122 is bent toward the coil axis direction.

The distal end portion of the pressing arm 122 is locked by a spring lock rib 119 protruded from the inner surface of the reinforcing rib part 112b in the torsion coil spring accommodating part H, so that a correct contact state of the pressing arm 122 on the inner surface of the reinforcing rib part 112b is secured.

The support arm 123 includes a rotation arm part 124 extending straight out of the lever body 110 through a cut-out portion 114 formed in the circular arc circumferential wall part 111a, and a locking arm part 126 extending continuously from the rotation arm part 124 via a bent portion 125, which constitutes a support part supported on the attachment surface, and toward a stopper member mounting part 130 of the lever body 110. In this embodiment, as illustrated in FIG. 1, the bent portion 125 is abutted and supported on a support wall part W of the attachment surface in a state in which the tensioner lever 100 is attached to the attachment surface.

In this embodiment, the locking arm part 126 is bent, within a plane vertical to the coil axis, toward the side where there is the winding part 121 to extend in a direction orthogonal to the rotation arm part 124.

The locking arm part 126 has a hook portion 127 at the distal end to be locked by the stopper member 150. In this embodiment, the hook portion 127 is formed in an L shape, with a distal end portion of the straight locking arm part 126 being bent to extend parallel to the rotation arm part 124.

Figure 4:
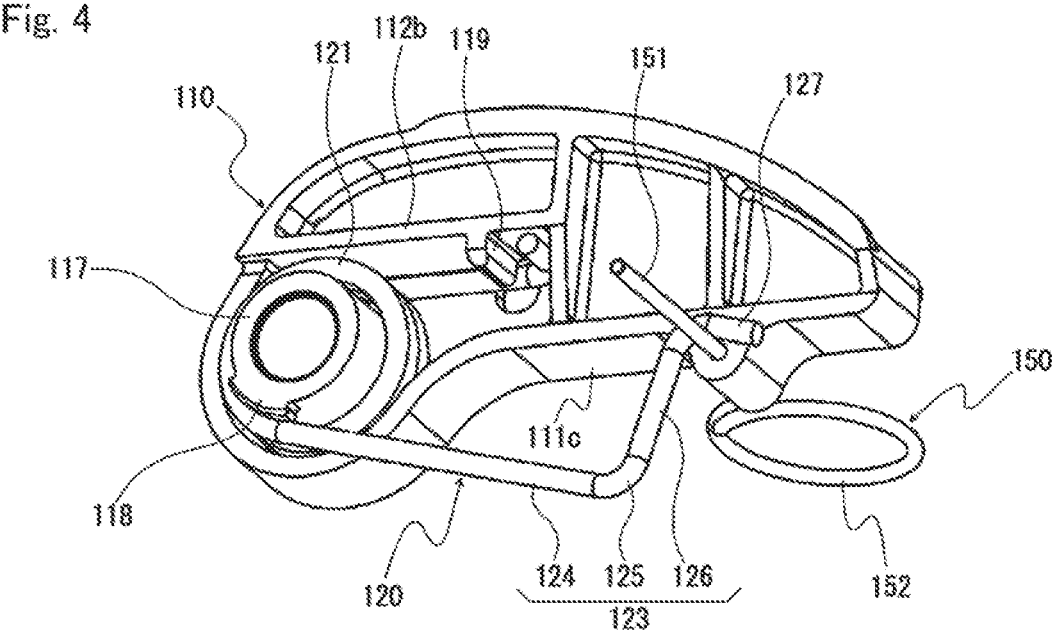
FIG. 4 is a perspective view on the backside illustrating a state in which the support arm is locked by the stopper member.

As described above, before the tensioner lever 100 is attached to the attachment surface, the support arm 123 of the torsion coil spring 120 is locked by the stopper member 150 so that the torsion coil spring 120 is retained in a compressed state, as illustrated in FIG. 4.

Furthermore, in the tensioner lever 100 of this embodiment, the stopper member mounting part 130 is positioned closer to the distal end than a center position Lc in the longitudinal direction of the lever body 110, or the center of gravity position of the lever body 110. If the center position in the longitudinal direction of the lever body 110 does not coincide with the center of gravity position of the lever body 110, the stopper member mounting part 130 may be positioned closer to the distal end than one of the center position in the longitudinal direction of the lever body 110 and the center of gravity position of the lever body 110 that is positioned closer to the base end.

The stopper member mounting part 130 is provided to protrude from the non-chain-side circumferential wall part 111c, and includes a pin lock hole 131 extending along the coil axis direction of the torsion coil spring 120.

The stopper member 150 of this embodiment is formed by bending a pin-like member made of metal or the like, for example, as illustrated in FIG. 4, and includes a rod-like shaft portion 151 removably inserted into the pin lock hole 131 of the lever body 110, and a ring-like finger hook 152.

In a state in which the tensioner lever 100 is attached to the attachment surface, as illustrated in FIG. 1, the stopper member 150 is pulled out and removed from the pin lock hole 131.

As described above, the support arm 123 of the torsion coil spring 120 is configured to include the locking arm part 126 that extends from the bent portion 125, which is abutted on the support wall part W to form a support point, toward the stopper member mounting part 130 of the lever body 110, in a state in which the tensioner lever 100 of this embodiment is attached to the attachment surface. This allows the stopper member mounting part 130 to be provided to a position closer to the distal end than the center position Lc in the longitudinal direction of the lever body 110, or the center of gravity position of the lever body 110. Accordingly, the load applied to the lever body 110 by the torsion coil spring 120 before the tensioner lever 100 is attached to the attachment surface can be reduced, so that deformation such as twisting of the lever body 110 resulting from the spring load of the torsion coil spring 120 can reliably be prevented.

While one embodiment of the present invention has been described in detail, the present invention is not limited to the embodiment described above and may be carried out with various design changes without departing from the scope of the present invention set forth in the claims.

For example, as opposed to the embodiment in which the support arm of the torsion coil spring includes a locking arm part, the support arm may not necessarily include a locking arm part.

Figure 5:
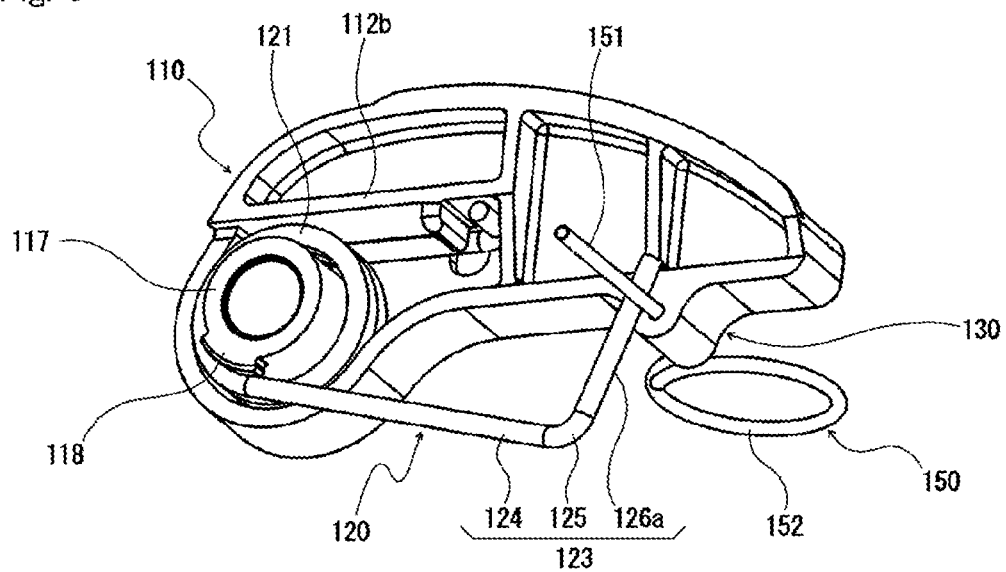
FIG. 5 is a perspective view on the backside illustrating the configuration of a tensioner lever that is another embodiment of the present invention.
Figure 6:
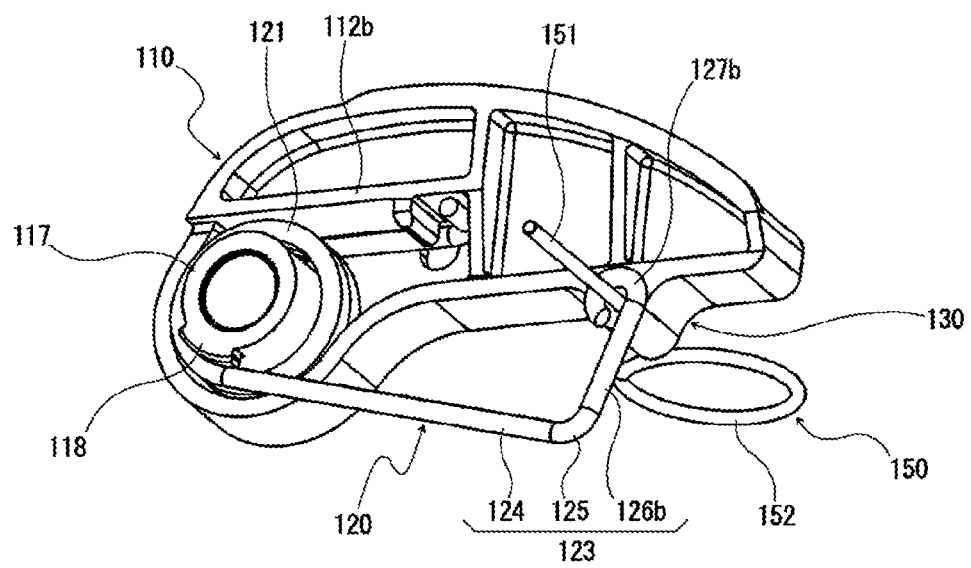
FIG. 6 is a perspective view on the backside illustrating the configuration of a tensioner lever that is yet another embodiment of the present invention.

The locking arm part 126a may not necessarily include a hook portion at the distal end and may extend straight, as illustrated in FIG. 5. Moreover, the hook portion need not necessarily be bent in an L shape. As illustrated in FIG. 6, the hook portion 127a may be formed in a circular arc shape. While the circular arc hook portion 127a in this embodiment is curved in a circular arc shape from the distal end of the locking arm part 126b toward the winding part, the hook portion may be formed to extend from the distal end of the locking arm part 126b in a circular arc curved toward the distal end of the lever body.

Moreover, while the locking arm part is bent at right angles with the base end here, the shape of the locking arm part is not limited to a particular one, and may be changed as suited in accordance with the purposes, depending on the position where the stopper member mounting part is formed on the lever body.

What is claimed is:

1. A tensioner lever comprising:
   a resin-made lever body having a shoe surface that is formed along a longitudinal direction and slidably guides a chain, and a base end rotatably supported on an attachment surface; and
   a torsion coil spring that is interposed between the lever body and the attachment surface and presses the shoe surface toward the chain,
   the torsion coil spring including
      a winding part loosely fitted around a boss part provided to the lever body,
      a pressing arm extending from one end of the winding part and making contact with the lever body, and
      a support arm extending from another end of the winding part and supported on the attachment surface,
   the lever body including
      a stopper member mounting part where a stopper member by which the support arm is locked and which retains the torsion coil spring in a compressed state is removably mounted,
   the stopper member mounting part being provided to a position closer to a distal end of the lever body than a center position in the longitudinal direction of the lever body, or a center of gravity position of the lever body,
   wherein the support arm includes a rotation arm part extending straight out of the lever body, and a locking arm part extending continuously from the rotation arm part via a bent portion, which constitutes a support part supported on the attachment surface, and toward the stopper member mounting part of the lever body,
   wherein the locking arm part is bent, within a plane vertical to a coil axis, toward the side where there is the winding part to extend in a direction orthogonal to the rotation arm part, and
   wherein in a state in which the support arm is locked by the stopper member, the bent portion constituting the support part supported on the attachment surface is separated from the stopper member mounting part by a length of the locking arm part in a direction of rotation of the rotation arm part.

2. The tensioner lever according to claim 1, wherein the support arm includes a hook portion to be locked by the stopper member at a distal end of the support arm.

3. The tensioner lever according to claim 1, wherein the lever body includes a reinforcing rib part configured to allow the pressing arm to make contact therewith over an entire length of the pressing arm.

\* \* \* \* \*